United States Patent Office 3,511,800
Patented May 12, 1970

3,511,800
SPINNABLE SOLUTIONS OF ACRYLONITRILE POLYMERS
Jenö Szita, Dormagen, Otto Unger, Goddelau, and Herbert Marzolph and Günther Nischk, Dormagen, Germany, assignors to Farbenfabriken Bayer Aktiengesellschaft, Leverkusen, Germany, a corporation of Germany
No Drawing. Filed Nov. 1, 1966, Ser. No. 591,144
Claims priority, application Germany, Nov. 10, 1965,
F 47,631
Int. Cl. C08f *3/76, 45/44, 45/46*
U.S. Cl. 260—30.8               7 Claims

ABSTRACT OF THE DISCLOSURE

By polymerising acrylonitrile alone or combined with other unsaturated monomers in organic solvents, in the presence of a catalyst system containing a sulfinic acid amide combined with an acid compound or a mixture of said compound and an organic peroxide, polymer solutions are obtained which can be spun into filaments having outstanding textile properties and usefulness.

---

This invention relates to a process for the production of spinnable solutions from polymers or copolymers of acrylonitrile, by polymerising acrylonitrile alone or in combination with other unsaturated copolymerisable compounds in organic solvents in the presence of an catalyst system containing a sulphinic acid amide which are active even at low temperatures (e.g. 15–35° C.). The polymer solutions formed after relatively short reaction times can be spun into filaments or fibres exhibiting outstanding textile properties, either directly on completion of polymerisation or after removal of any unreacted monomer residues.

There are already numerous processes for the production of spinnable solutions from acrylonitrile polymers and copolymers by polymerisation in organic solvents. These processes have a number of advantages over the hitherto conventional large-scale processes in which polymerisation was carried out in aqueous media, whilst the resulting polymers had to be isolated, dried, granulated and then re-dissolved if spinnable solutions were to be obtained. The advantages of the solution polymerisation process, however, can only be made use of in cases where the resulting spinning solutions, or the filaments spun, from them satisfy certain requirements as regards their quality. Above all, the spinning solutions must exhibit the high viscosities and polymer concentrations required for spinning, whilst the molecular weight of the polymer has to lie in a range most suited to the production of fibres. Another factor governing the use of spinning solutions is that they should be light in colour (almost colourless or only very slightly discoloured), clear (free from undissolved solids or gel particles) and stable towards discolouration and gelatinisation.

The requirement of relatively high molecular weights, which are essential for fibre purposes, involves long reaction times in the case of organic solvents with high chain transfer capacities, particularly in the case of demethyl formamide.

It is known that acrylonitrile polymers discolour very easily, particularly in solution. Discolouration is caused by auto-oxidation reactions and by nucleophilic reagents which can be formed by thermal and/or hydrolytic decomposition of solvent or catalysts or other additives. In general, however, these reactions only proceed at fast rates above temperatures in the range from 40 to 50° C.

Consequently, in cases where polymerisation involves lengthy reaction times but, above all, high reaction temperatures, products which are discoloured or otherwise of little practical use are inevitably formed. Accordingly, one important requirement which the catalysts used have to satisfy is that, even at low temperatures, small quantities thereof should be sufficient to produce high polymerisation velocities, i.e. high yields, in the shortest possible reaction times. In addition, they should be completely soluble in the reaction medium and should remain in solution, even during polymerisation because undissolved catalyst residues, or precipitated salts or products of decomposition, increase the tendency towards gelation and complicate further processing.

In the conventional processes, it was not possible for all these requirements to be satisfied at the same time. Proposed catalysts for the solution polymerisation of acrylonitrile in organic solvents, have included boron trifluoride, azo compounds, inorganic and organic peroxides, and the sodium salt of toluene sulphinic acid. It was found with these catalysts that either the yield of polymer and the molecular weights obtained were not high enough (boron trifluoride), or that high reaction temperatures or long reaction times were necessary to obtain industrially usable products (azo compounds and peroxides alone). In the case of peroxides, particularly in dimethyl formamide solution, the high reaction temperatures quickly gave rise to unwanted discolouration of the solutions. When azo catalysts were used, polymerisation had to be carried out in the absence of atmospheric oxygen, on account of its inhibiting effect. For the same reason, monomers containing polymerisation-stabilisers (inhibitors) could not be directly used either. They had to be removed before hand, generally by distillation, as a result of which the process was further complicated. In cases where inorganic peroxides or alkali metal salts of sulphinic acids were used, further disadvantages were the low solubility of these compounds in the reaction medium and the fact that, during preparation and during the polymerisation reaction itself, there were considerable deposits of salts which were either impossible to dissolve or could only be dissolved at very high temperatures. As a result, both the spinning properties and the storage properties of the spinning solutions were very considerably impaired. Proposed redox catalyst systems comprised peroxides in dimethyl sulphoxide solution with formamidine sulfinic acid. In this case, too, as with the other catalysts referred to above, it was impossible to obtain polymerisation velocities high enough for practical purposes at temperatures below 40 to 50° C.

It has been found that acrylonitrile can be reproducibly polymerized in solution, either alone or in combination with other unsaturated copolymerisable compounds, in organic solvents at temperatures as low as 15 to 35° C. and at high velocities, by using as the catalyst, organic sulfinic acid amides in combination with (a) concentrated organic and/or inorganic acids or (b) with oxidising agent such as organic peroxides and, preferably, additional concentrated organic and/or inorganic acids. The resulting viscous and spinnable solutions are colourless or are discoloured only to a very limited extent, and clear, gel-free and stable towards discolouration and gelation.

The present invention provides a process for the production of spinnable solutions of polyacrylonitrile and its copolymers containing at least 50% of acrylonitrile by the polymerization of acrylonitrile either on its own or in combination with other monomers in an organic solvent with the aid of catalysts, wherein a mixture of a sulphinic acid amide and a concentrated organic or inorganic acid and/or an organic peroxide is used as the catalyst.

The sulphinic acid amides which may be used as polymerisation catalysts may be represented by the following general formula:

$$R-\underset{\underset{O}{\|}}{S}-N\diagdown \begin{array}{c}R'\\R''\end{array}$$

in which R represents an aliphatic or an aromatic radical which may contain other substituents, for example halogen, alkyl, alkoxy or aryl and R' and R'' represent hydrogen, lower alkyl or aryl radicals or, together with N, represent a heterocyclic radical.

Aromatic sulphinic acid amides such as benzene and substituted benzene sulphinic acid amides, are preferably used because they are easy to prepare, stable and soluble in the reaction medium, and because of their high activity. The following sulphinic acid amides are mentioned by way of example:

| | | M.P. (° C.) |
|---|---|---|
| Benzene-sulphinic acid amide | $C_6H_5-SO-NH_2$ | 121 |
| p-Toluene-sulphinic acid amide | $CH_3-C_6H_4-SO-NH_2$ | 120 |
| p-Chlorobenzene-sulphinic acid amide | $Cl-C_6H_4-SO-NH_2$ | 127 |
| N,N-dimethyl-benzene sulphinic acid amide | $C_6H_5-SO-N\diagdown\begin{array}{c}CH_3\\CH_3\end{array}$ | [1] 56 |
| N,N-dimethyl-toluene sulphinic acid amide | $CH_3C_6H_4-SO-N\diagdown\begin{array}{c}CH_3\\CH_3\end{array}$ | 52–53 |
| N,N-methylphenyl-benzene-sulphinic acid amide | $C_6H_5-SO-N\diagdown\begin{array}{c}CH_3\\C_6H_5\end{array}$ | ---------- |
| N,N-diethyl-p-chlorobenzene-sulphinic acid amide. | $Cl-C_6H_4-SO-N\diagdown\begin{array}{c}C_2H_5\\C_2H_5\end{array}$ | ---------- |
| Benzene-sulphinic acid morpholide | $C_6H_5-SO-N\langle\text{morpholine}\rangle$ | 75 |
| p-Toluene-sulphinic acid morpholide | $CH_3-C_6H_4-SO-N\langle\text{morpholine}\rangle$ | 128 |
| p-Chlorobenzene-sulphinic acid morpholide. | $Cl-C_6H_4-SO-N\langle\text{morpholine}\rangle$ | 137 |
| Benzene-sulphinic acid piperidide | $C_6H_5-SO-N\langle\text{piperidine}\rangle$ | 114–116 |
| p-Chlorobenzene-sulphinic acid piperidide. | $Cl-C_6H_4-SO-N\langle\text{piperidine}\rangle$ | 137 |
| N,N-dimethyl-β-naphthalene-sulphinic acid amide. | naphthyl$-SO-N\diagdown\begin{array}{c}CH_3\\CH_3\end{array}$ | ---------- |
| Methane-sulphinic acid anilide | $CH_3-SO-HN-C_6H_5$ | 86–88 |

[1] Oil, B.P. 553.

The aforementioned compounds may be prepared by processes similar to those described in the literature for the production both of benzene- and toluene-sulphinic amides (Braun and Kaiser, Ber., 56, 553) and of methane-sulphinic acid anilide and toluidide (J. Org. Chem., 23, 1958–807).

It is of advantage to use, as oxidising agents, organic hydroperoxides, for example, tert.-butylhydroperoxide or cumene hydroperoxide; keto-peroxides for example, cyclohexanone peroxide, methyl ethyl- or methyl isobutyl ketone peroxide; acyl peroxides, for example, lauroyl peroxide, diacetyl peroxide, benzoyl- or 2,4-dichlorobenzoyl peroxide; or per esters, for example tert.-butyl perbenzoate, tert.-butyl diperphthalate, tert.-butylperlaurinate, tert.-butyl peracetate, mono-tert.-butyl permaleate, tert.-butyl peroctoate, tert.-butyl perisobutyrate or tert.-butyl perpivalate.

Suitable inorganic acids include hydrochloric acid, phosphoric acid and, preferably, sulphuric acid, whilst suitable organic acids include aromatic sulphonic acids, for example, benzene or toluene sulphonic acid, tetrahydronaphthalene sulphonic acid and, isopropyl or diisopropyl-benzene sulphonic acid, as well as oxalic acid and, preferably, aromatic disulphonimides of the general formula $$R-SO_2-NH-SO_2-R'$$

for example, benzene or toluene disulphonimide. In dimethyl formamide, both organic and inorganic acids may be used, whilst in dimethyl sulphoxide and dimethyl acetamide organic acids are advantageous used for the peroxide/sulphinamide catalyst system.

In place of the aforementioned acids, it is also possible to use unsaturated, copolymerisable compounds containing free concentrated acid groups, for example, methylacrylaminobenzene-disulphonimide. Alternatively, a combination of the aforementioned acid compounds could also be used. In cases where the catalyst systems according to the invention are used, polymerisation can be accelerated by the addition of small quantities of primary or secondary amines. To prevent discolouration of the spinning solutions at elevated temperatures, it has proved to be of particular advantage to add aminosulphonic acids, such as taurine, N-methyl taurine, sulphanilic acid or N-methylsulphanilic acid, as accelerators.

The presence in the reaction medium of small quantities of water has a favourable effect on the polymerisation reaction. The reaction velocity is increased whilst for velocities of the same order (in comparison with water-free mixtures) there is an increase in molecular weight.

Polymerisation reaction is not affected by the atmospheric oxygen dissolved in the reaction mixture, although it is of advantage, in cases where the peroxide/sulphinamide/acid catalyst system is used, to carry out polymerisation in a sealed reaction vessel under a slight positive pressure of a protective gas (for example nitrogen), so as to prevent more oxygen from entering while the reaction is in progress. It is even possible to use monomers containing stabilisers, for example, thiosemicarbazide, ammonia, hydroquinone or derivatives thereof, without purifying them beforehand.

Dimethyl formamide, dimethyl acetamide and dimethyl sulphoxide are preferably used as the solvents for polymerisation. It is possible, however, to use the organic solvents normally employed for acryonitrile polymers and copolymers.

Solution polymerisation of the acryonitrile is preferably carried out in the presence of other olefinically unsaturated copolymerisable compounds, for example, methacrylonitrile, acrylic or methacrylic esters or amides, styrene and its derivatives, vinyl chloride or vinylidene chloride. If for example, an acrylic or methacrylic ester, a vinyl ester or a styrene derivative is polymerised in quantities of 1 to 10% by weight, preferably 5 to 7% by weight, with acrylonitrile, the solubility of the resulting polymers in the reaction medium is very considerably increased. As a result, it is possible to use a higher initial concentration and to obtain correspondingly higher reaction velocities, molecular weights and concentrations of polymer in solution. In addition, filaments obtained from the aforementioned copolymers show a better affinity for dyes. In order to obtain a greater affinity for dark-coloured dyes, further comonomers with acid or basic groups, for example, styrene sulfonic acid, methacrylaminobenzene, benzene disulphimide or vinyl pyridine, may be included in the polymerisation reaction.

When it is desired to obtain modacrylic filaments or fibres with specific properties, larger quantities of the comonomers are generally used. It is possible to obtain spinning solutions of extremely high concentration by copolymerising acrylonitrile with, for example 20 to 50% by weight of vinylidene chloride.

Filaments spun from solutions of this kind show greatly reduced flammability and combustibility.

Irrespective of the solvent or comonomers used and their ratio to the acrylonitrile, the ratio between monomer component and solvent component in the reaction mixture may be varied within wide limits. When acrylonitrile is polymerised in dimethyl formamide alone, the monomer concentration has to be kept below 25% by weight if clear, non-gelated solutions are to be obtained. When acrylonitrile is polymerised in combination with, for example, 5 to 8% by weight of methyacrylate, vinyl acetate or styrene, the initial monomer concentration may be from 15% to 40% by weight, preferably from 25 to 35% by weight, without any danger of the solution becoming gelatinous or turning cloudy either during or on completion of polymerisation. Where acrylonitrile is copolymerised with 25 to 45% by weight of vinylidene chloride, the monomer concentration in dimethyl formamide may with advantage be from 30 to 60% by weight. The limits to the initial monomer concentration in dimethyl acetamide and in dimethyl sulphoxide are 5 to 10% by weight lower than is the case with dimethyl formamide, because of their poorer dissolving properties. The reaction mixture used for polymerisation contains up to 3% by weight, preferably 0.2 to 1% by weight—calculated on the weight of the monomer—of the aforementioned compound in the case of the sulfinic acid amide/acid catalyst combination. The molar ratio of sulphinic acid amide to acid may with advantage be in the range from 1:0.2 to 1:4. When the peroxide/sulphinic acid amide acid catalyst system is used, the components are each used in quantities of up to 2% by weight, preferably in quantities of 0.05 to 0.5% by weight. The molar ratio of peroxide to sulphinic acid amide is preferably from 1:0.2 to 1:8, whilst the acid is intended to be used in an up to four-fold molar excess relative to the sulfinic acid amide.

Because of the high activity of the catalyst systems according to the invention, the polymerisation temperature may be chosen within a wide range from 0 to 80° C. Polymerisation is preferably initiated at around the ambient room temperature in the range from 15 to 35° C. It will then depend upon the intensity of cooling whether, and to what extent, the reaction temperature is increased during polymerisation by the heat evolved in the exothermic reaction. In dimethyl formamide or dimethyl acetamide solution, polymer yields of 50 to 80% can be obtained over periods varying from 5 to 20 hours, and over periods varying from 3 to 10 hours in dimethyl sulphoxide solution, in which case polymers are formed which have molecular weights suitable for the production of fibres, preferably with relative viscosities ($\eta_{rel.}$) of 1.75 to 2.0, measured in 0.5% by weight solution in dimethyl formamide at 20° C. (corresponding to K-values according to Fikentscher of 75 to 85).

After the required conversion or solution concentration has been obtained, a known polymerisation inhibitor and/or a concentrated acid is stirred into the solution. This is done to prevent the formation of low molecular weight products during further processing of the solution. The solution can then be spun by the known wet or dry spinning processes, either directly or after any unreacted monomers have been removed, for example in a falling-film evaporator at reduced pressure.

Spinning solutions prepared by the process according to the invention are colourless or show only slight yellowing, and are clear and gel-free, so that their further processing is easy and in no way complicated. Following removal of the unreacted monomers, they can be stored for prolonged periods without any appreciable changes in viscosity. The spun filaments have a high degree of whiteness, outstanding thermal stability and excellent textile properties.

The most important advantage of the process according to the invention is that polymerisation can be carried out at high velocities at low temperatures. As a result, it is possible to obtain acrylonitrile copolymers which are particularly sensitive to temperature, for example, copolymers containing vinyl or vinylidene chloride, or copolymers with basic comonomers, of considerably improved quality (e.g. degree of whiteness and thermal stability). In addition, polymerisation can be carried out at room temperature, as a result of which the reaction itself is easily controlled, whilst processing and the apparatus required, particularly for moderate-scale and large-scale application, can be simplified very considerably, thus reducing costs. The following examples illustrate more specifically the invention:

EXAMPLE 1

23.5 g. of acrylonitrile, 1.5 g. of methyl acrylate, 0.35 g. of benzene-sulphinic acid amide and 0.2 g. of concentrated sulphinic acid, were dissolved in 75 g. of dimethyl sulphoxide. The reaction mixture was left standing at room temperature (22–24° C.) in an Erlenmeyer flask covered by a watch glass. After a reaction time of eight hours, a pale yellow, clear and viscous solution with a polymer concentration of 18.2% by weight (correspondng to a yield of 73%) was formed. The polymer had a relative viscosity of 1.73 (K-value=74.8).

EXAMPLE 2

The same reaction components as used for Example 1 were dissolved in 75 g. of dimethyl acetamide and similarly polymerised for 20 hours at room temperature. The yield was 64.8% and the $\eta_{rel}$ of the polymer 1.63. (K-value=70.2). The viscous solution was pale yellow in colour.

EXAMPLE 3

A reaction mixture containing 65 g. of dimethyl formamide, 32.8 g. of acrylonitrile, 2.2 g. of methyl acrylate, 1.0 g. of methacrylaminobenzene-benzene-disulphimide and 0.4 g. of benzene-sulphinic acid amide was polymerised for 20 hours as described in Example 1. The resulting light, clear solution contained 21.4% by weight of polymer with a relative viscosity of 1.70. The films prepared from the solution showed an affinity for dark, basic dyes and only yellowed slightly on being heated for 1 hour at 160° C.

EXAMPLE 4

A 100-ml.-capacity long-necked flask with a ground glass stopper was used as the reaction vessel for this series of tests. The reaction mixtures each contained 75 g. of dimethyl sulphoxide, 23.5 g. of acrylonitrile, 1.5 g. of methyl acrylate and mono-tert.-butyl-permaleate (50% by weight solution in dimethyl phthalate), benzene sulphinic acid amide and an organic acid, optionally together with water. The completely full and closed reaction vessels were each placed in a water bath at 25° C. After a reaction time of 4 hours, the resulting viscous solutions were precipitated in a mixture of water and methanol. The yields, the relative viscosities of the polymers and the appearance of the solutions, as well as the quantities of catalyst, acid and water used are set out in Table 1 below:

EXAMPLE 5

A monomer mixture of the kind described in Example 4, in dimethyl sulphoxide was polymerised for 6 hours at 15° C. with 0.42 g. of mono-tert.-butyl permaleate (50% by weight solution) 0.29 g. of benzene sulphinic acid amide and 0.6 g. of methacrylaminobenzene-benzene-disulphimide. The yield was 71%, the relative viscosity 2.12. The viscous solution obtained was completely colourless.

EXAMPLE 6

65 g. of dimethyl formamide, 2.1 g. of methyl acrylate, 32.9 g. of acrylonitrile and 0.42 g. of mono-tert.-butyl-permaleate (50% by weight solution), were heated for 10 hours at 15° C. as described in Example 4. A colourless viscous solution with a polymer concentration of 25.5% by weight (yield=73%) was formed. The relative viscosity of the polymer was 1.82.

EXAMPLE 7

In order to demonstrate the effectiveness of the catalyst systems with various sulphinic acid amides, the following series of tests was conducted. In each instance, the reaction mixture comprises 65 g. of dimethyl formamide 32.9 g. acrylonitrile, 2.1 g. of methyl acrylate, 0.3 g. of mono-tert.-butyl permaleate (50% by weight solution), 0.3 g. of sulphinic acid amide and 0.2 g. of concentrated sulphuric acid. The reaction was carried out at 35° C. for four hours: Table 2 shows the test results and the sulphinic acid amides used:

TABLE 2

| Test No. | Sulphinic acid amide | Conversion (percent) | $\eta$ rel. | Colour of the solution |
|---|---|---|---|---|
| 1 | Benzene-sulphinic acid amide | 76.0 | 1.54 | Pale yellow. |
| 2 | p-Toluene-benzene-sulphinic acid amide. | 60.3 | 1.72 | Colourless. |
| 3 | p-Chlorobenzene-sulphinic acid amide. | 63.0 | 1.68 | Do. |
| 4 | N,N-dimethyltoluene-sulphinic acid amide. | 68.8 | 1.63 | Do. |
| 5 | Benzene-sulphinic acid morpholide. | 66.3 | 1.65 | Do. |
| 6 | p-Toluene-sulphinic acid morpholide. | 56.7 | 1.78 | Almost colourless. |

EXAMPLE 8

Further catalyst combinations of various peroxides and sulphinic acid amides were used for the following examples. The reaction mixture, the quantities of catalyst and acid and the reaction conditions were as described in Example 7, and the reaction time was 6 hours. The results and catalyst combinations are set out in Table 3 above.

TABLE 3

| Test No. | Peroxide | Sulphinic acid amide | Conversion (percent) | $\eta$ rel. | Colour of the solution |
|---|---|---|---|---|---|
| 1 | Lauroyl peroxide | N,N-dimethyl-sulphinic acid amide | 63.3 | 1.91 | Pale yellow. |
| 2 | do | Benzene-sulphinic acid morpholide | 64.0 | 1.82 | Almost colourless. |
| 3 | do | p-Toluene-sulphinic acid morpholide | 61.2 | 1.87 | Do. |
| 4 | Methyl ethyl ketone peroxide (50% by weight solution.) | N,N-dimethyl-toluene sulphinic acid imide | 59.6 | 1.90 | Pale yellow. |
| 5 | do | Benzene-sulphinic acid morpholide | 58.0 | 1.83 | Colourless. |
| 6 | do | p-Toluene-sulphinic acid morpholide | 55.7 | 1.79 | Do. |

TABLE 1

| Test No. | Peroxide (g.) | Sulphinamide (g.) | Organic acid (g.) | Water (g.) | Conversion percent | $\eta$ rel. | Appearance of the solution |
|---|---|---|---|---|---|---|---|
| 1 | 0.28 | 0.195 | p-Isopropyl-benzene sulphonic acid (0.3) | | 78.4 | 1.71 | Clear, pale yellow. |
| 2 | 0.32 | 0.225 | do | 0.6 | 64.0 | 2.06 | Clear, colourless. |
| 3 | 0.28 | 0.195 | Diisopropyl-benzene sulphonic acid (0.3) | | 75.6 | 1.72 | Clear, pale yellow. |
| 4 | 0.28 | 0.195 | do | 0.6 | 72.0 | 1.76 | Clear, almost colourless. |
| 5 | 0.30 | 0.21 | Tetrahydronaphthalene sulphonic acid (0.3) | | 69.4 | 1.73 | Clear, pale yellow. |
| 6 | 0.30 | 0.21 | do | 0.6 | 71.4 | 1.72 | Clear, almost colourless. |
| 7 | 0.38 | 0.265 | Methacroylaminobenzene-benzene-disulphimide (0.6). | | 67.6 | 1.87 | Clear, colourless. |
| 8 | 0.38 | 0.265 | do | 0.6 | 70.3 | 1.85 | Clear, colourless. |

EXAMPLE 9

The following reaction mixture was polymerised in nitrogen at 25° C. in a pressure-tight sealed glass reaction vessel: 50 g. of dimethyl formamide, 30 g. of acrylonitrile 20 g. of vinylidene chloride, 0.3 g. of mono-tert.-butyl permaleate (50% by weight solution), 0.24 g. of benzene sulphinic acid amide, 1.2 g. of methacrylaminobenzene-benzene-disulphimide and 0.1 g. of concentrated sulphuric acid. After 16 hours, an almost colourless viscous solution with a polymer concentration of 37% by weight was formed (yield=74%). The polymer had a relative viscosity of 1.84 and a chlorine content of 28.3% by weight and was almost incombustible. The films prepared from it showed a high affinity for basic dyes.

EXAMPLE 10

In the manner set out in Example 9, the following mixture was used for polymerisation: 50 g. of dimethyl formamide, 32.5 g. of acrylonitrile, 17.5 g. of vinylidene chloride, 0.33 g. of mono-tert.-butyl permaleate, 0.23 g. of benzene sulphinic acid amide, 0.1 g. of concentrated sulphuric acid, 0.3 g. of taurine and 0.6 g. of water. After 16 hours at 25° C., a pale yellow 41.7% by weight polymer solution was formed (yield=83.4%, $\eta_{rel.}$=2.11). The highly concentrated solution had an outstanding filament drawing capacity. The polymer contained 24.3% by weight of chlorine and showed greatly reduced combustibility.

EXAMPLE 11

A reaction mixture of 6.5 kg. of dimethyl formamide. 3.29 kg. of acrylonitrile, 210 g. of methyl acrylate, 9.5 g. of mono-tert.-butyl permaleate (=19 g. of a 50% by weight solution in dimethyl phthalate) 16 g. of benzenesulphinic acid morpholide and 15 g. of concentrated sulphuric acid, was stirred for 20 hours at a nitrogen pressure of 0.5 atmosphere, in a double-walled 25-litre-capacity V4A-autoclave equipped with stirring mechanism, thermometer, a vacuum and a nitrogen attachment. The temperature of the solution was kept between 30 and 35° C. by means of an automatic control. An almost colourless clear and viscous solution with a polymer content of 25.6% by weight was obtained (yield=73%) which, following the addition of a polymerisation inhibitor, was spun by a known dry-pinning process. The polymer had a relative viscosity of 1.87 (K-value=81.3).

EXAMPLE 12

A 200-litre-capacity autoclave equipped as described in Example 11 was used as the reaction vessel. Only a cooling water pipe was attached to the outer wall of the autoclave. The reaction mixture contained 65 kg. of dimethyl formamide, 32.7 kg. of acrylonitrile, 2.3 kg. of methyl acrylate, 800 g. of methacrylaminobenzene-benzene-disulphimide, 290 g. of a 50% by weight solution mono-tert.-butylpermaleate, 200 g. of benzene sulphinic acid amide and 55 g. of concentrated sulphuric acid. After the reactants had been introduced (in a nitrogen atmosphere) polymerisation began at room temperature. As the temperature rose to 30° C. by virtue of the heat evolved during the exothermic reaction, the cooling system was brought into operation, after which the temperature gradually rose during polymerisation to 38° C. despite intensive stirring. After 20 hours, the reaction was stopped by the addition of an inhibitor, and the 27% by weight light-coloured, clear polymer solution (conversion 77%) was diluted with dimethyl formamide to 24% by weight. The unreacted monomer residues were then removed from the solution by falling-film or thin-film distillation at reduced pressure. Following distillation, the solution had a concentration of 28.8% by weight and was spun by a dry spinning process into white, thermally stable filaments exhibiting good textile properties. The filament showed an affinity for basic Astrazon dyes, even the dark variety. The polymer had a relative viscosity of 1.80.

EXAMPLE 13

54 kg. of dimethyl formamide, 29.5 kg. of acrylonitrile, 16.5 kg. of vinylidene chloride, 230 g. butyl permaleate (50% by weight solution) 160 g. of benzenesulphinic acid amide, 200 g. of toluene disulphimide and 52 g. of concentrated sulphuric acid, were polymerised in the same reaction vessel and under the same conditions as described in Example 12. After a reaction time of 20 hours, the temperature of the solution rose to 37° C., an almost colourless, clear and viscous solution being formed. The polymer concentration was 32.6% by weight, the yield was 70.8% and the relative viscosity of the polymer was 1.76 (K-value=76). The solution was diluted to a concentration of 28% by weight and distilled and was then spun, at a concentration of 37% by weight, by the dry spinning process. A sample taken from the highly concentrated distilled solution was stored for 30 days at room temperature. There was no change in its viscosity over this period.

EXAMPLE 14

The following mixture was polymerised as described in Example 12: 52 kg. of dimethyl formamide, 28.8 kg. of acrylonitrile, 19.2 kg. of vinylidene chloride, 1.4 kg. of methacrylaminobenzene-benzene-disulphimide, 700 g. of water, 240 g. of butyl permaleate (50% by weight solution) and 185 g. of p-toluenesulphinic acid amide. The temperature rose during polymerisation to 42° C. The polymerisation time was 16 hours, the solution concentration was 36% by weight, the conversion was 73% and the K-value was 81.4. A pale yellow clear solution was spun by the dry spinning process, directly after polymerisation had been stopped by the addition of an inhibitor. Compared with chlorine-containing modacrylic filaments obtained by the conventional method (aqueous polymerisation), the filaments were brilliant white and thermally stable. They were receptive to dark basic dyes, exhibited good textile properties coupled with greatly reduced combustibility. Chlorine content=27.7% by weight.

What we claim is:
1. A process for the production of spinnable solutions of acrylonitrile polymers which comprises subjecting to polymerizing conditions of a temperature of 0° to 80° C. for a time of 3 to 20 hours a solution of up to 60% by weight of monomer composition in an organic solvent, said monomer composition containing from 50% to 100% acrylonitrile and from 15% to 60% of a copolymerisable ethylenically unsaturated compound and said organic solvent being selected from the group consisting of dimethyl formamide, dimethyl acetamide, and dimethyl sulfoxide, the polymerisation taking place in the presence of 0.05 to 3.0% by weight of a catalyst mixture consisting essentially of an organic sulfinic acid amide containing at least one cyclic group in combination with a member selected from the group consisting of (a) an acid compound and (b) a mixture of an acid compound and an organic peroxide, the acid compound being selected from the group consisting of benzene sulfonic acids, toluene sulfonic acids, tetrahydronaphthalene sulfonic acids, isopropylbenzene sulfonic acids, diisopropylbenzene sulfonic acids, oxalic acid, benzene disulfonimide, toluene disulfonimide, methacrylaminobenzene-benzene-disulfimide, hydrochloric acid, phosphoric acid and sulfuric acid, and the organic peroxide selected from the group consisting of tert.-butyl-hydroperoxide, cumene hydroperoxide, cyclohexanone peroxide, methyl ethyl ketone peroxide, methyl isobutyl ketone peroxide, lauroyl peroxide, diacetyl peroxide, benzoyl peroxide, and 2,4-dichlorobenzoyl peroxide, wherein the molar ratio of said organic sulfinic acid amide to said acid compound is 1:0.2 to 1:4 and the molar ratio of said organic peroxide to said organic sulfinic acid amide is 1:0.2 to 1:8.

2. The process of claim 1, wherein said polymerising being effected at a temperature in the range of from about +15 to 35° C.

3. A method in accordance with claim 1, wherein the quantity of the catalyst mixture is 0.2–3% by weight based on the weight of the monomer and the monomer concentration is 25–35% by weight.

4. The process as claimed in claim 1, wherein said organic acid compound is an aromatic sulfonic acid.

5. The process of claim 1, wherein said organic acid compound is an aromatic disulphonimide.

6. The process of claim 1, wherein said organic acid compound is an unsaturated copolymerisable compound having acidic groups.

7. The process of claim 1, wherein said organic solvent is dimethylformamide.

References Cited

UNITED STATES PATENTS

| | | | |
|---|---|---|---|
| 3,165,500 | 1/1965 | Logemann et al. | 260—85.5 |
| 3,213,069 | 10/1965 | Rausch | 260—85.5 |
| 3,219,643 | 11/1965 | Uchiyama et al. | 260—85.5 |
| 3,380,976 | 4/1968 | Izumi et al. | 260—88.7 |

ALLAN LIEBERMAN, Primary Examiner

U.S. Cl. X.R.

260—32.6, 85.5, 88.7